2 Sheets--Sheet 1.

M. RAY.
Harvester-Rake.

No. 168,526. Patented Oct. 5, 1875.

WITNESSES:

INVENTOR:
Moses Ray
BY
ATTORNEYS.

M. RAY.
Harvester-Rake.
No. 168,526.
Patented Oct. 5, 1875.
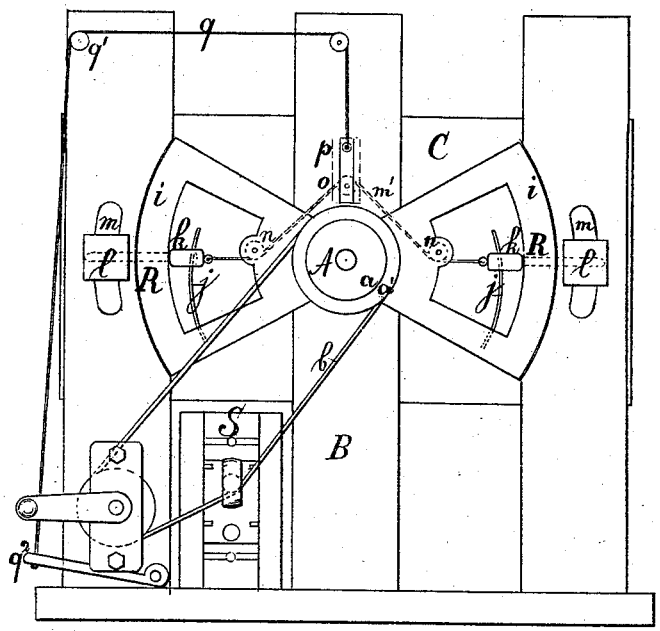
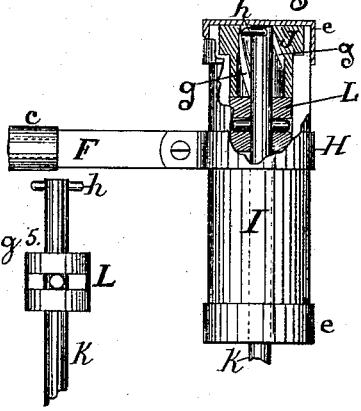
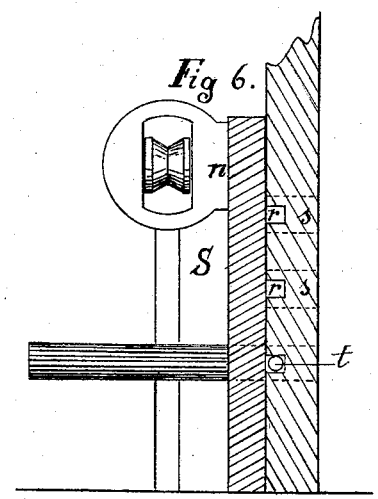
WITNESSES:
Colon C. Kemon
Chas. A. Pettit
INVENTOR:
Moses Ray
BY
ATTORNEYS.

UNITED STATES PATENT OFFICE.

MOSES RAY, OF VALLEY GROVE, WEST VIRGINIA.

IMPROVEMENT IN HARVESTER-RAKES.

Specification forming part of Letters Patent No. 168,526, dated October 5, 1875; application filed March 10, 1875.

*To all whom it may concern:*

Be it known that I, MOSES RAY, of Valley Grove, in the county of Ohio and State of West Virginia, have invented a new and Improved Harvester-Rake; and I do hereby declare that the following is a full, clear, and exact description of the same, reference being had to the accompanying drawing, forming a part of this specification, in which—

Figure 1:
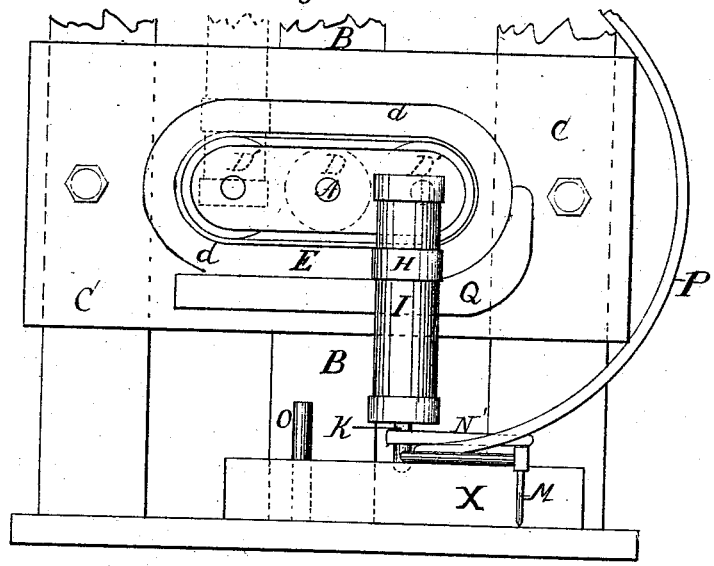
Figure 2:
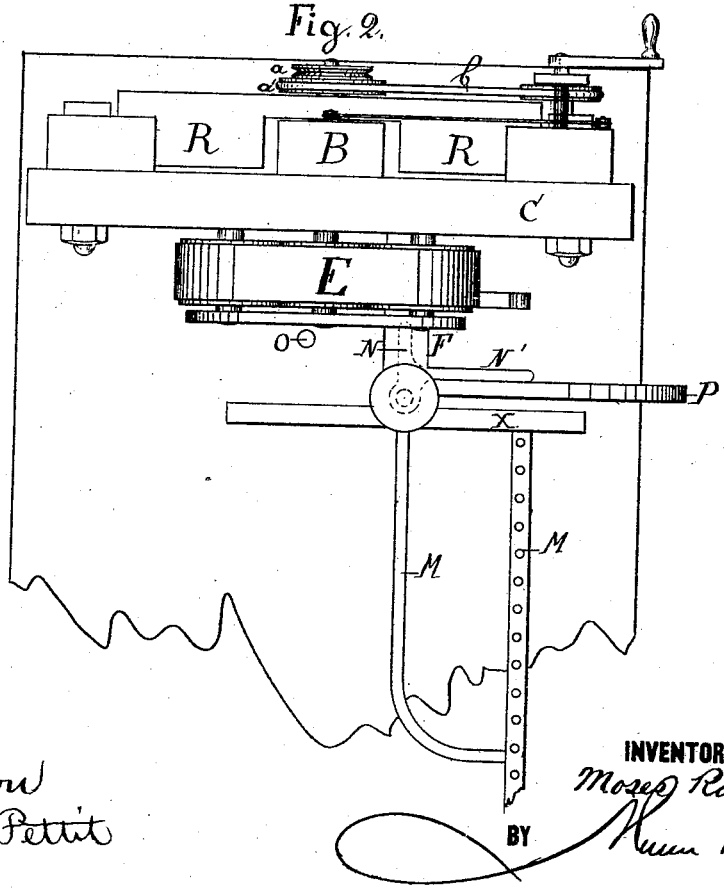

Figure 1 is a vertical front elevation; Fig. 2, a plan view; Fig. 3, a vertical rear elevation; Fig. 4, a detail of the barrel I, with portion broken away, showing its internal construction; Fig. 5, a detail of the rake-standard and its weight; Fig. 6, a sectional detail of the band-tightener.

This invention relates to certain improvements in harvester-rakes; and it consists in a shaft driven by the harvester mechanism, and terminating in a pulley, which engages by frictional contact with two other similar pulleys, one on each side. Around these pulleys passes a band, to which is attached an arm or extension, one end of which is provided with a friction-roller, and moves in a groove in the adjustable supporting-frame, and the other end carrying at right angles to the arm a barrel. In said barrel is contained a loose standard, which carries the rake. The standard falls out of the barrel of its own gravity when on the descending part of its revolution, and the rake takes the gavel at the cutter-head and delivers it at the side of the harvester in the rear, a projecting arm attached to the rake-standard striking a pin upon the table and giving the rake the necessary sweep. On the ascent of the rake the standard is telescoped into the barrel and out of the way until ready for the next gavel. The entire frame-work carrying the above-described mechanism is pivoted upon the main shaft, and is provided with adjustable locking devices, which engage with vertical supports, and give the necessary adjustment to the rake for high or low grain. Different-sized pulleys are also placed upon the main shaft, and the band provided with a tightener, by means of which the speed of the rake may be varied.

In the drawing, A represents the main shaft, which is journaled in the central support B, and upon which is pivoted the adjustable frame C.

The said shaft carries at one end the different-sized pulleys $a\ a'$ for the connecting-band $b$ of the harvester mechanism, and terminates at the other end in a broad-faced pulley, D, that engages by frictional contact with two other pulleys, D', around all of which passes a band, E. To said band is attached an arm, F, one end of which carries a friction-roller, $c$, that moves in a groove, $d$, of the adjustable frame C, which latter is pivoted upon the main shaft. To the other end of said arm is attached a collar, H, that holds the barrel I in such a manner as to allow it an adjustment by loosening a screw that clamps said collar, and moving the barrel either up or down to suit the height of the grain. Said barrel has end caps $e\ e$, which are held together by rods, and contains at one end a casting, J, provided with spiral ways $g\ g$, covering an arc of about one hundred and twenty degrees, or the sweep of the rake. Loosely moving inside said barrel is the rake-standard K, which is attached to a weight, L, in the cylinder in such a manner as to move longitudinally with it, but to have a revolution of about one hundred and twenty degrees (or the sweep of the rake) independently of it, the said weight having for this purpose a slot, in which moves a cross-pin attached to the standard. At the end of the standard, also, is a second cross-pin, $h$, which, when the standard is telescoped into the barrel of its own weight, moves in the spiral ways in the casting J, and restores the rake to its first position, (before having moved over the arc of one hundred and twenty degrees during the sweep.) To the free end of the standard K are attached the rake M and the arms N N', the first of which arms engages with a pin, O, in the table, to give the rake the necessary sweep to deliver the gavel to the side, and the second to engage with a guide, P, which, in the downward part of the revolution, prevents the rake-standard from tangling the standing grain by falling out before it is in the proper position at the cutter-head. Q is a guard-railing attached to frame C to steady the arm F during the sweep of the rake. In the rear of the adjustable frame C, rigidly attached thereto, and pivoted upon the same main shaft, are the symmetrical adjusting devices R R, by means of which the rake is adjusted to high or low grain. They consist of hollow segments $i\ i$, springs $j\ j$, and locking-bolts $k\ k$, that engage with holes in the side supports, and perforated pins $l\ l$, attached to frame C, and moving through arc-slots $m\ m$, the said bolts being connected by a cord, $m'$, running around pulleys $n\ n$ in the segments, and $o$ in the detachable piece $p$, which latter piece is raised by the cord, pulleys, and treadle $q\ q^1\ q^2$, for the retraction of the locking-bolts. S is the band-tightening device, which consists of a standard having grooves $r$ and perforations $s$, in which is adjustably held a cross-pin, $t$, attached to the frame $u$, that carries the pulley.

The operation of the improved rake is as follows: The machine being adjusted as to speed and the height of the grain, a revolution of the main shaft carries the barrel and rake around with the band. As the barrel descends the rake-standard falls out, and the rake, being controlled in its descent by the guide P, takes the gavel and carries it to the rear, moving upon a guard-rail, $x$. One of the arms attached to the rake-standard then strikes the pin O, giving the said rake a sweep to one side, the slot in the weight in the cylinder allowing the standard a partial revolution. Now, as the rake rises, gravity carries it back, telescoping it into the barrel, the spiral casting restoring the rake to the position which it occupied before the rotary sweep.

Having thus described my invention, what I claim as new is—

1. The combination of the barrel I, the hollow casting J, having internal spiral ways $g$, and the loosely-moving standard K, carrying weight L and pins $h$, substantially as and for the purpose described.

2. The combination of the arm F, the collar H, the adjustable barrel I, the telescopic standard K, the rake-arm M, arms N N', the pin O, and guide-rail P, substantially as and for the purpose described.

3. The adjusting device consisting of the hollow segments $i\ i$, springs $j\ j$, locking-bolts $k\ k$, and the cord and pulley for operating the same, all combined and arranged substantially as shown and described.

MOSES RAY.

Witnesses:
SOLON C. KEMON,
CHAS. A. PETTIT.